(12) United States Patent
Mayumi

(10) Patent No.: US 6,541,886 B2
(45) Date of Patent: Apr. 1, 2003

(54) MOTOR

(75) Inventor: Eiji Mayumi, Nagano (JP)

(73) Assignee: Sankyo Seiki Mfg., Co. Ltd., Nagano (JP)

( * ) Notice: Subject to any disclaimer, the term of this patent is extended or adjusted under 35 U.S.C. 154(b) by 0 days.

(21) Appl. No.: 09/879,281

(22) Filed: Jun. 12, 2001

(65) Prior Publication Data

US 2002/0024265 A1 Feb. 28, 2002

(30) Foreign Application Priority Data

Jun. 14, 2000 (JP) ........................................ 2000-178924

(51) Int. Cl.[7] ................................................ H02K 5/00
(52) U.S. Cl. .......................... 310/91; 310/89; 310/49 R
(58) Field of Search .......................... 310/91, 89, 49 R, 310/71, 258, 90

(56) References Cited

U.S. PATENT DOCUMENTS

| | | | |
|---|---|---|---|
| 4,381,465 A | * | 4/1983 | Renkl ........................ 310/49 R |
| 5,811,903 A | | 9/1998 | Ueno et al. |
| 6,046,519 A | * | 4/2000 | Hanazumi et al. ........ 310/49 R |
| 6,255,749 B1 | * | 7/2001 | Aoshima et al. .......... 310/49 R |

* cited by examiner

Primary Examiner—Thanh Lam
(74) Attorney, Agent, or Firm—Reed Smith LLP

(57) ABSTRACT

A motor comprises a stator, a rotor being arranged in and facing said stator, an urging member which urges a center rotation shaft of the rotor in an axial direction, and a bearing which rotatably holds the rotor at a predetermined position while receiving an urging force by the urging member. The stator is provided with a resin coil bobbin made by insert molding and integratedly assembled with a metal stator core. The stator core is arranged in and faces the rotor and forms a magnetic circuit therewith. The coil bobbin is arranged at the end side of the rotor. A holding portion is integratedly formed, the holding portion holds the urging member so as to urge the rotor to the bearing side. A curling base is fitted in. The curling base is formed such that a flat plate-shaped metal plate is rounded from outside of a winding wound by the electric coil bobbin in the circumference direction of the stator.

6 Claims, 4 Drawing Sheets

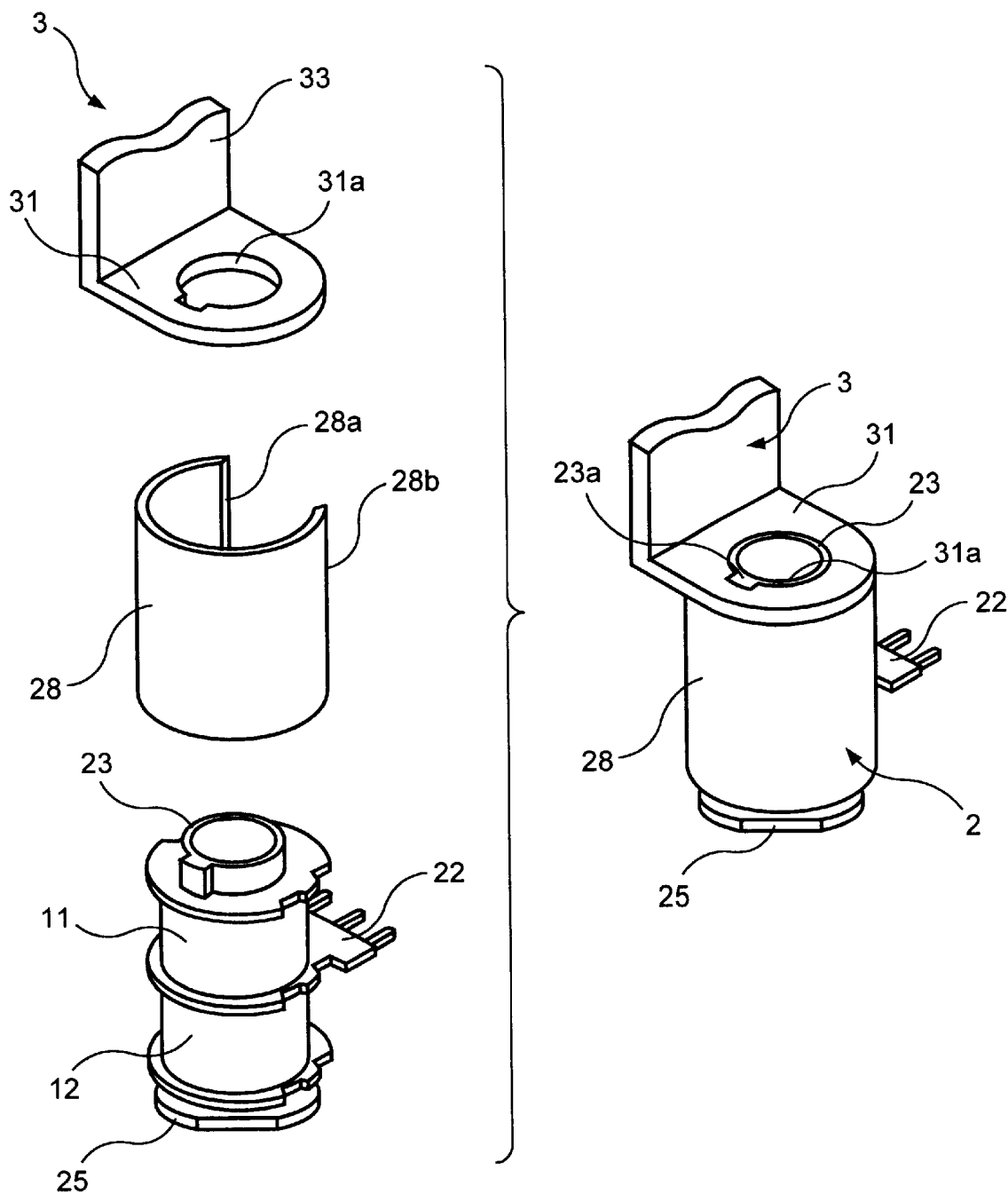
F I G. 2

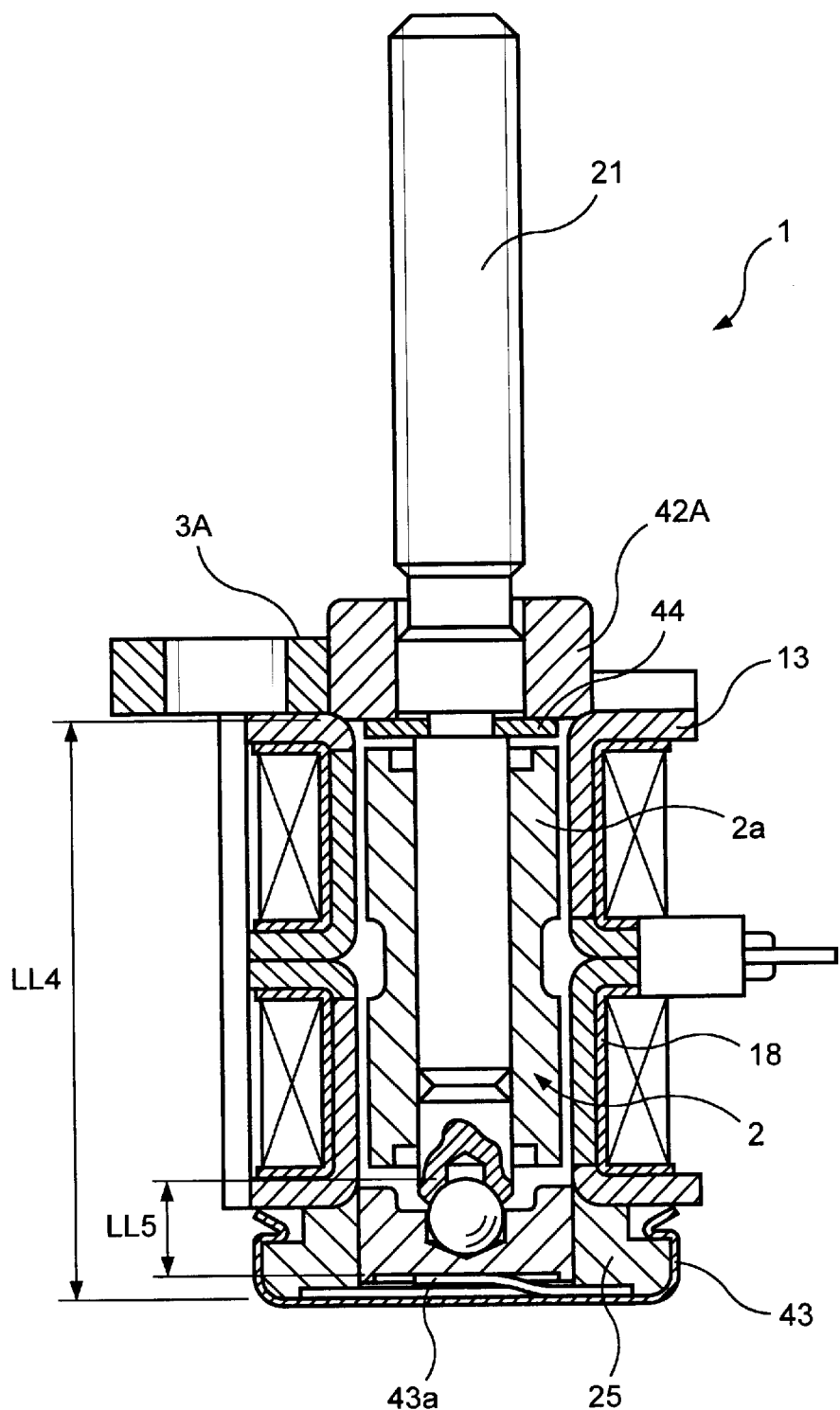
F I G. 3

MOTOR

BACKGROUND OF THE INVENTION a) Field of the Invention

The present invention relates to improvement of a motor allowing rotation while urging an end of its center shaft of a rotor in the axial direction.

b) Description of the Related Art

FIG. 4 shows conventional structure of a motor allowing rotation while urging an end of its center shaft of a rotor in the axial direction.

In a motor of FIG. 4, a pair of inside stator cores 51a and outside stator cores 51b are arranged in a shaft direction.

A coil bobbin with a wound winding is provided between the inside stator cores 51a and the outside stator cores 51b.

Rotor 52 is positioned rotatably within said inside stator cores 51a and outside stator cores 51b.

Each outside stator cores 51b serves as an outer enclosure case covering the motor from outside in an axial direction and in a radial direction which becomes the outside of the winding.

And an end face in an outside part of each winding of both outside stator cores 51b is fixed by welding (as shown in a weld, T1).

Cap member 54 is fixed to one edge surface of one outside stator core 51b in a shaft direction (corresponding to the end surface of an outer packing retaining shield) by welding (as shown in weld, T2).

Bearing 60 is fitted in cap member 54 and bearing 60 supports one end of center shaft 53 of rotor 52.

Furthermore, at the outside of the cap member 54, urging member 65 is attached having spring 65a which urges bearing 60 toward the direction of a bearing 63 (a bearing held by frame 55 is shown).

In addition, frame 55, which is substantially U-shaped, is fixed to one of the end faces of the side of the other outside stator core 51a (corresponding to an end face of the outer enclosure case) by welding (as shown in a weld, T3).

As described above, one end of center shaft 53 of rotor 52 is supported by bearing 60 which fits in inside of cap member 54.

And another end goes through stator 51 and protrudes to a greater degree than another end side.

That is, center shaft 53 of rotor 52 is inserted in hole 61a which is formed on plane portion 61 of the side fixed to stator 51 of frame 55 and end part of center shaft 53 is supported by bearing 63 that is fitted in plane portion 62.

In addition, the circumference of center shaft 53 is composed of reed screw portion 57.

As described above, the motor is configured to rotate while loading (preloading) the end of center shaft 53 of rotor 52 to bearing 63 arranged in frame 55 by urging bearing 60 toward the direction of bearing 63.

The reason is because rotor 52, caused to rotate mainly on center shaft 53, rotates in a stable state against stator 51 at a predetermined position.

Both control of the dimension (measurement) of the full length in an axial direction of center shaft 53 and control of the spring power of spring 65a of urging member 65 need to be strictly done because rotor 52 cannot rotate smoothly at the predetermined position. Thus these controls are important in such a motor.

In addition, control of the dimension (measurement) of the full length of center shaft 53 in an axial direction is done by controlling the dimension (measurement) between the deepest portions of each hole of both bearings 60, 63 (as shown in FIG. 4, L1).

Control of the spring power of spring 65a of urging member 65 is done by controlling the dimension (measurement) from mounting surface to mount cap member 54 to hold bearing 60 in one outside stator core 51b to the right-side end in FIG. 4 (as shown in L6) and a control of distance (L7) is done from a point of action of spring 61a to a position to abut with bearing 60 on center shaft 53.

Control of dimensions (measurements) in an axial direction of both outside stator core 51b which are faced and arranged in rotor 52 (as shown in L4, L5) and control of dimensions (measurements) of the full length of the whole stator (L4+L5) in an axial direction are important in order to precisely make above described L1.

As described above, in order to control the distance from a point of action of spring 65a of urging member 65 to an abutting position with bearing 60 on center shaft 53, control of a dimension (measurement) in an axial direction from welding surface with one outside stator core 51b of cap member 54 to urging member 61 (as shown in L6) is important, too.

However, the above described motor has the constitution that both outside stator cores 51b are laminated and welded, as well as both sides in the axial direction welded frame 55 and cap member 54.

Therefore it is difficult to control the dimension (measurement) of the full length of stator 51 side corresponding to the full length of center shaft 53 of rotor 52.

In other words, as described above, both outside stator core 51b (L4+L5) and the dimensions (measurements) from the welding surface that frame 55 and stator core 51b contact with the surface of the inside of plane portion 62 (stator 51 side) (L3), therefore, it is necessary to carefully control the dimensions (measurements) of each part in forming a member of several parts.

Thus, when assembling, there is the problem that great confusion results in producing the required overall dimension (measurement) and clearance of each part is difficult.

In addition, when welding these parts, it is necessary to indicate that thickness of a welded location varies by pressure force in a calculation of the overall dimension, so that the work is extremely difficult.

Cap member 54 for holding urging member 65 has the structure that is fixed to one outside stator core 51b by welding as described above so that the above described problem occurs between stator core 51b and cap member 54.

Therefore, confusion may exist concerning the distance L7 from a welding surface between outside stator core 51b and cap member 54 to an out side surface of urging member 65.

As a result, the motor has the overall problem that confusion results in the dimension (measurement) of distance(L6) from a point of action of spring 65a to an abutting position with bearing 60 on center shaft 53.

In other words, even if it is assumed that all dimension (measurement) control of above described L1 . . . L7 (L2=dimensions(measurements) from a deepest portion of a hole of bearing 63 to a mounting portion to mount bearing 63 in frame 55) can be strictly controlled, the above described motor still includes the problem that confusion occurs in determining a dimension (measurement).

OBJECT AND SUMMARY OF THE INVENTION

It is a primary object of the invention to provide a motor which can easily and precisely control the dimensions (measurements) of a stator part which faces and is arranged with a rotor and also controls the urging power of a spring for urging the rotor in a direction of the frame.

In accordance with the invention, a rotor comprises a stator, a rotor being arranged in and facing said stator, an urging member which urges a center rotation shaft of the rotor in an axial direction, and a bearing which rotatably holds the rotor at a predetermined position while receiving an urging force by the urging member. The stator is provided with a resin coil bobbin made by insert molding and integratedly assembled with a metal stator core. The stator core is arranged in and faces the rotor and forms a magnetic circuit therewith. The coil bobbin is arranged at the end side of the rotor. A holding portion is integratedly formed, the holding portion holds the urging member so as to urge the rotor to the bearing side. A curling base is fitted in. The curling base is formed such that a flat plate-shaped metal plate is rounded from outside of a winding wound by the electric coil bobbin in the circumference direction of the stator.

BRIEF DESCRIPTION OF THE DRAWINGS

In the drawings:

FIG. 2 shows an exploded respective view of a stator as a feature of the motor of FIG. 1 and a frame rigid by a stator;

FIG. 3 is a sectional view which shows the overall constitution of a motor of the second embodiment of the present invention.

DESCRIPTION OF THE PREFERRED EMBODIMENTS

A description is presented of the first preferred embodiment of the present invention.

Figure 1:
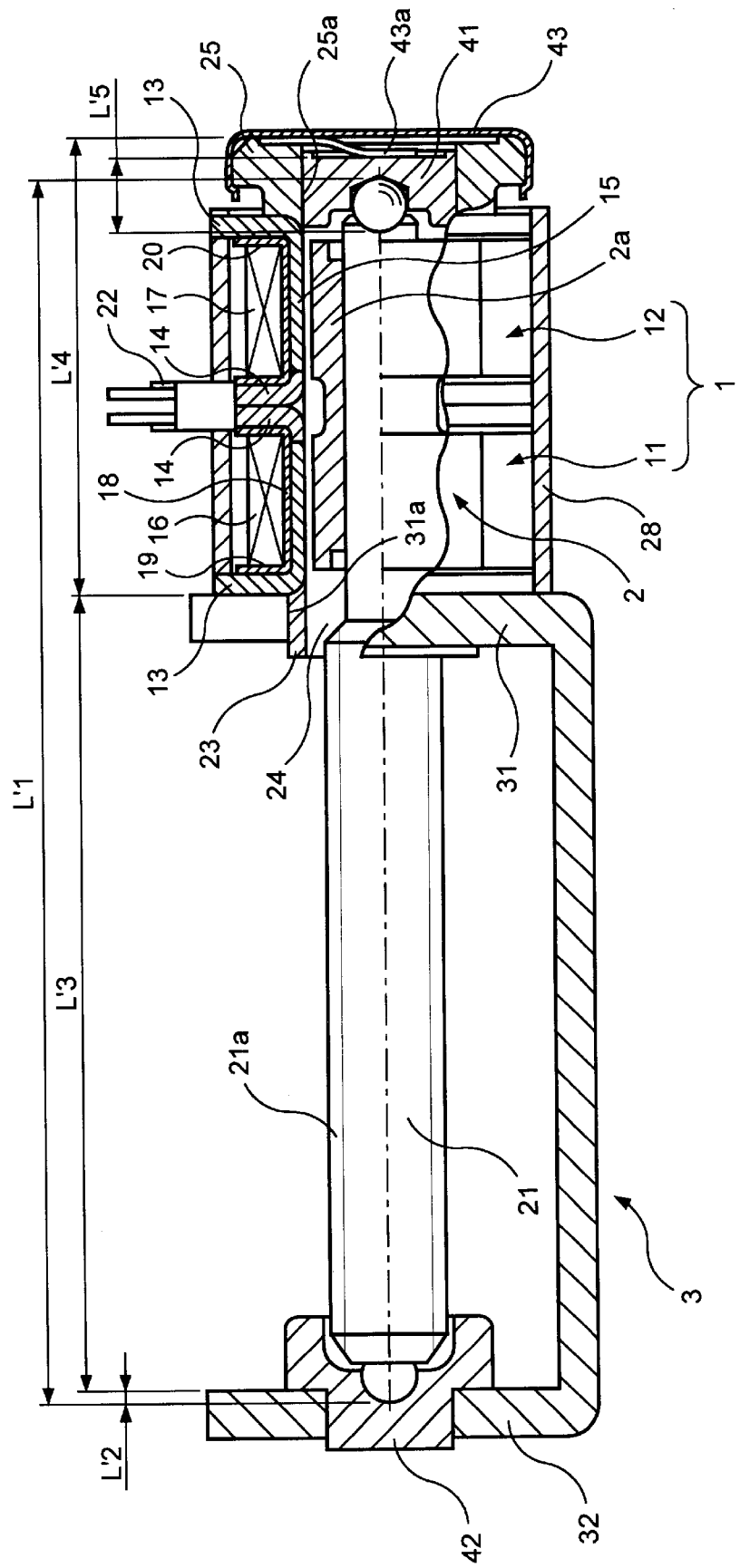
FIG. 1 is a sectional view which shows the overall constitution of a motor of the first embodiment of the present invention.
Figure 4:
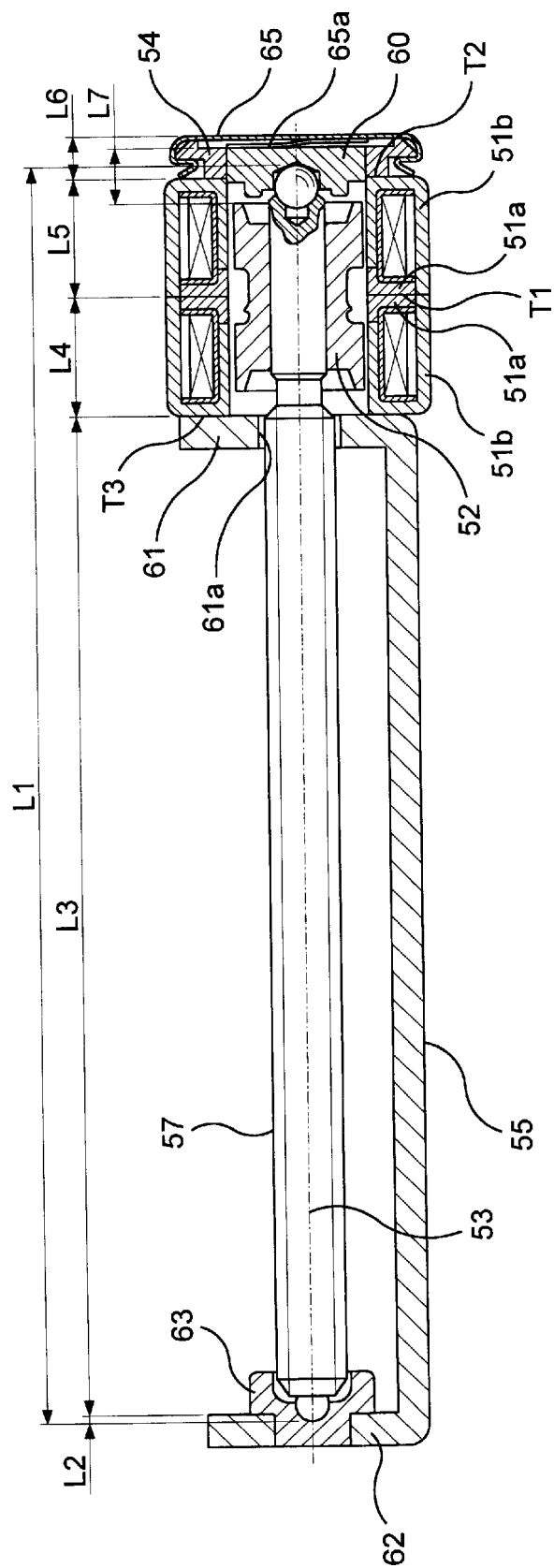
FIG. 4 is a sectional view which shows the overall conventional constitution.

FIG. 1 is a sectional view which shows the entire motor of the first embodiment of the present invention.

FIG. 2 is an exploded respective view where the stator becomes a feature of a motor and one part of a frame is made rigid by a stator.

As shown in FIG. 1, a motor of the first preferred embodiment of the present invention (a detailed description of this embodiment consists of a stepping motor, but only the motor is described as follows) is provided with a stator 1, a rotor 2 that faces and is arranged with stator 1, and metal frame 3, which is formed in substantially U-shape, which is made rigid in an end face of one side of stator 1.

The center shaft 21 of rotor 2 protrudes from an end face of one side of stator 1. The protruded end portion is supported by bearing 42 that is held by metal frame 3.

Stator 1 has a constitution that laminates two pairs of stator cores 11,12 in an axial direction and rotor 2 is arranged rotatably in the inside of the stator 1.

Each stator core 11, 12 comprises an outside yoke 13 which is arranged in the laminated state in an axial direction outside and inside yoke 14 which are adjacent, and is arranged in a laminated state.

Both yokes 13,14 consist of a magnetized metal member and the internal circumference of both yokes 13,14 is provided with side pole tooth 15 which faces and is arranged to an outer circumferential surface of magnet portion 2a of rotor 2.

Two sets of the above described outside yoke 13 and inside yoke 14 are formed integratedly with coil bobbins 18 by insert molding and coil bobbins 18, which are made of resin, wind winding 16,17.

Winding spaces to wind winding 16,17 are formed between inside yoke 14 and outside yoke 13 among corresponding pairs.

Coil bobbin 18 consists of a resin member and has winding assembling portion 19,20 to wind winding 16,17 respectively.

An internal circumference part of coil bobbin 18 is provided with hole portion 24 surrounding the circumference of rotor 2.

Note that the surface of the above described pole tooth 15 is exposed to the inside of a hole in this hole portion 24 and the magnet portion 2a of rotor 2 to be described below is faced.

Winding 16, 17 are wound by winding assembling portion 19,20 of coil bobbin 18 and start and end of portions for winding the winding 16,17 are connected with terminal portions 22, respectively.

The terminal portion 22 is molded with coil bobbin 18 integratedly and is caused to protrude in a radial direction to the outside of an opening portion of a case 28 formed by curling as described below.

Furthermore, stator 1 is extended in the right side in FIG. 1. and has cap member 25 which is caused to protrude from an aperture part of the case 28 in an axial direction.

The cap member 25 is arranged in the end side of rotor 2.

Cap member 25 has circular hole 25a and hole 25a supports bearing 41 to support an end of center shaft 21 of rotor 2 (right side end in FIG. 1) after rotor 2 is inserted in the inside of stator 1 as described below.

Note that, when assembling, the hole 25a functions as an entrance portion to allow rotor 2 to be inserted inside of stator 1.

Cap member 25 thus composed is molded integratedly with coil bobbin 18 and circular hole 25a of cap member 25,with a serial hole, continues in above described hole portion 24.

Bearing 41 to support an end of center shaft 21 of rotor 2 (FIG. 1, right side end) fits in circular hole 25a of cap member 25.

After rotor 2 is assembled in stator 1, the bearing 41 is fitted in the hole 25a of cap member 25.

After the bearing 41 remains fitted, urging member 43 fits in cap member 25 and is held.

Urging member 43 comprises spring 43a with which an end part of bearing 41 is abutted, and urges bearing 41 in the side of metal frame 3.

In other words, bearing 41, for supporting an end of center shaft 21 of rotor 2, is positioned between urging member 43 and center shaft 21.

An urging member 43 urges rotor 2 to the side of metal frame 3 by always providing an urging force to bearing (a bearing of the side of metal frame 3) 42 side against bearing 41, and center shaft 21 is pushed toward bearing 42. As a result, rotation of rotor 2 is stable.

In this embodiment, cap member 25 functions as a maintenance portion for holding the urging member 43.

The case 28 formed by curling fits in outside of both stators core 11,12 of stator 1, namely the outside of winding 16,17 that are wound in coil bobbin 18.

The case 28 is formed to round a flat board-shaped metal plate in a lap direction of stator 1.

As shown in FIG. 2, when case 28 is fitted, both ends portion 28a, 28b of case 28 in a circumferential direction abut the terminal portion 22. Both ends portion 28a, 28b abut on either side of terminal portion 22 respectively.

Thus, the portion between both ends portion 28a, 28b of case 28 is an opening portion and terminal portion 22 protrudes from the opening portion.

As described above, in the first preferred embodiment, the motor case is that the case 28 formed by curling is merely fitted from outside.

Therefore both ends surfaces of stator 1 in an axial direction are not covered with a metal case.

In such a constitution as described above, it is possible that cap member is formed by resin molding integratedly in one side of coil bobbin 18

Moreover, outer diameter of the cap member 25 can be increased almost equally as the inside diameter of case 28. (if the outer diameter of cap member 25 is bigger than the inside diameter of case 28, it is impossible to make case 28 slide (and fitted) to an axial direction from the side of cap member 25).

As thus described, when cap member 25 is composed to the described above size, holding (Maintenance) of urging member 43 by cap member 25 is more assured.

On the other hand, to an end face of the left side of one outside yoke 13 of stator 1 in FIG. 1, substantially U-shaped metal frame 3 is fixed.

In other words, the end face of one outside yoke 13 is an abutting surface which fixes metal frame 3 by direct contact.

Note that, in coil bobbin 18, which is made from resin, cylinder portion 23 is formed.

Cylinder portion 23 passes in an internal circumference portion of the abutting surface of the outside yoke 13 from an edge portion of above described hole portion 24 and is extended to the side of metal frame 3.

Cylinder portion 23 is inserted in through hole 31a which is formed on metal frame 3 while abutting outside yoke 13.

Before assembling in rotor 2 to the inside of stator 1, metal frame 3 is first fixed on stator 1.

The metal frame 3 has the first plane portion 31 as a fixed surface to stator 1 and the second plane portion 32 that faces and is arranged in the first plane portion 31.

These both planes portion 31,32 are arranged perpendicular to center shaft 21 of rotor 2 and both planes portion 31,32 are coupled by coupling surface portion 33 in parallel with center shaft 21.

In the first plane portion 31 as a fixed surface to stator 1, through hole 31a is provided to go through center shaft 21 of rotor 2.

The cylinder portion 23 of described above stator 1 goes into the through hole 31a and cylinder portion 23 is press-fitted in and through the through hole 31a so that metal frame 3 is fixed in stator 1 with positional accuracy.

In addition, a circular hole is formed on the second plane portion 32 of metal frame 3.

Bearing 42 to support an end of center shaft 21 fits in this hole and is fixed.

Rotor 2 is arranged rotatably in hole portion 24 of stator 1 and has magnet portion 2a which faces and is arranged in pole tooth 15 of stator 1 and metal center shaft 21 so that one side protrudes from an axial direction end face of magnet portion 2a at the center rotation position of the magnet portion 2a.

As shown in FIG. 1, reed screw portion 21a is formed in circumference of a protruding part by magnet portion 2a of center shaft 21 of rotor 2.

Note that, the screw portion of the head member which is not illustrated is engaged threadedly to the reed screw portion 21a.

When reed screw portion 21a rotates, the head portion moves to a direction to the right and left in FIG. 1.

The rotor 2 is assembled such that the side on which reed screw portion 21a is formed is inserted in hole portion 24 from the side of cap member 25 of stator 1.

In other words, an end of reed screw portion 21a side of center shaft 21 of rotor 2 is inserted in hole 25a of cap member 25.

Next, reed screw portion 21a passes hole portion 24 and passes then cylinder portion 23 stood by an edge of hole portion 24.

Furthermore, rotor 2 is inserted to the depths of stator 1 and an end of center shaft 21 engages with the second bearing 42 in which is fitted plane portion 32 of metal frame 3.

Afterwards, bearing 41 is insert in hole 25a of cap member 25. Furthermore, while making spring 43a abut the end side of the bearing 41, Cap member 25 is covered with urging member 43. Thus this motor is assembled.

In the motor thus fabricated, when an electric current is supplied in winding 16,17 of stator 1, rotor 2 rotates while being supported by both bearings 41,42 bearing while rotor 2 is urged toward the side of bearing 42.

A head member threadedly engaged to reed screw portion 21a by this rotation moves in an axial direction.

As described above, the present invention has constitution that two stator core 11,12 which are laminated and arranged in an axial direction, are formed integratedly by insert molding with coil bobbin 18.

When metal frame 3 arranged in the left in FIG. 1 is fixed on stator 1, metal frame 3 directly contacts in outside yoke 13 of one stator core 11 and cap member 25 as a holding (maintenance) portion of urging member 43 arranged in the right side is formed integratedly on coil bobbin 18. Coil bobbin is made from resin.

If a dimension (measurement) in an axial direction of coil bobbin 18 (as shown in FIG. 1, L '4) is controlled, it is possible to control a dimension (measurement) of wide range from an abutting surface with metal frame 3 to an end of cap member 25 as a surface to abut with urging member 43.

As a result, it is possible to reduce some problems wherein a dimension (measurement) error as in prior art accumulates, moreover, confusion of a dimension (measurement) occurring due to a change of thickness of a member by welding is reduced.

In addition, control of dimensions (measurements) described above L '4 becomes more certain so that position accuracy of urging member 43 improves.

As a result, it is easy to control spring pressure force(an urging power) as opposed to bearing 41 too.

That is, position accuracy of spring 43a opposing bearing 41 is improved so that it is easy to control a dimension (measurement) of distance (as shown in L '5) from the abutting portion, which spring 43a abuts in bearing 41, as a point of action of spring 43a to an abutting portion with bearing 41 and center shaft 21.

Therefore, it is possible to keep spring pressure force opposing center shaft 21 constant.

Furthermore, because rotor 2 rotates while receiving spring pressure force constant, position accuracy opposing stator 1 of rotor 2.

As thus described, according to the present invention, except for a dimension (measurement) (L '2, L '3) of metal frame 3 and bearing 42 fixed by metal frame 3, a dimension (measurement) (L '5) of both distance from a portion to abut which dimension (measurement) of coil bobbin 18 in an axial direction (L '4) and spring 43a abutting bearing 41 to a portion to abut with bearing 41 and center shaft 21 of rotor 2 are controlled, and a dimension (measurement) between portions of both bearings 41,42 (L '1) is controlled.

Accordingly, it is possible to improve rotation position precision of rotor 2.

The description of the first preferred embodiment is an example of preferred detailed description of the preferred embodiment of the present invention. Various changes and modifications are also possible without deviating from subject matter of the present invention.

For example, in above described detailed description of the preferred embodiment, cylinder portion 23 is provided with an edge of hole portion 24 of coil bobbin 18 made by resin and is fitted in through hole 31a of metal frame 3 so that metal frame 3 is fixed on stator 1 with accuracy.

However, cylinder portion 23 doesn't fit in through hole 31a so as to go through center shaft 21, a protruding portion and a concavity portion which fits in metal frame 3 may be provided in an abutting surface with metal frame 3 of coil bobbin 18.

Furthermore, in the first preferred embodiment, a substantially U-shaped metal frame 3 is fixed on an end face portion in an axial direction of coil bobbin 18 (an abutting surface).

The other member fixed by an end face portion of coil bobbin 18 does not need to have the shape described above.

The second preferred embodiment is described in the following with reference to FIG. 3.

As shown in FIG. 3, flat board-shaped attaching member 3A abut an end face portion (an abutting surface) of outside yoke 13 in an axial direction.

Outside yoke 13 is formed integuratedly in coil bobbin 18 by insert molding.

Bearing 42A is fitted in the attaching member 3A and the bearing 42A supports an end of center shaft 21 of rotor 2 protruded from stator 1.

The bearing 42A are molded integuratedly with coil bobbin 18 by resin.

Similar to the first preferred embodiment of, in addition, in the end of the other side bearing 42A of coil bobbin 18 in an axial direction, cap member 25 is molded integuratedly with coil bobbin 18 by resin.

Washer 44 is arranged between bearing 42A and magnet portion 2a of rotor 2 and is loosely fitted in center shaft 21.

Rotor 2 is urged, as shown in FIG. 3, along with center shaft 21 to the top, and, as for the washer 44, an end abuts a lower part of bearing 42A by means of an urging force by urging member 43 held by cap member 25.

Rotor 2 with center shaft 21 is urged in an upper direction in FIG. 3b by means of an urging force provided by urging member 43 held by cap member 25.

Thus, the upper end of the washer 44 abuts a lower part of bearing 42A as shown in FIG. 3.

In a motor of the second preferred embodiment, cap member 25 as a holding (maintenance) portion for holding bearing 41 and another bearing 42 together are integratedly formed with coil bobbin 18.

Therefore, control of dimensions (measurements) of both bearings 41,42 in FIG. 3 is made of both distance (LL4) from a bottom end surface of bearing 42A molded integratedly to a bottom end surface of cap member 25 and A dimension (measurement) of distance (LL5) from the abutting portion which spring 43a abuts in bearing 41 to an abutting portion with bearing 41 and center shaft 21 of rotor 2.

As a result, rotor 2 rotates while receiving constant spring pressure force and it is possible to improve rotation position precision of rotor 2.

As described above, the motor of this present invention can easily control the dimension (measurement) of the overall length of the stator in a shaft direction by controlling the overall length of the coil bobbin molded resin in the shaft direction.

In addition, the problem of dimension (measurement) error caused by accumulations of production tolerances is reduced.

Furthermore, it is ease to control the dimension (measurement) between the urging member held by the holding portion of the motor of the present invention and the rotor.

While the foregoing description and drawings represent the present invention, it will be obvious to those skilled in the art that various changes may be made therein without departing from the true spirit and scope of the present invention.

What is claimed is:

1. A motor comprising:
    a stator with two pairs of stator cores, the stator cores being laminated together;
    a rotor being arranged in and facing said stator;
    an urging member which urges a center shaft of said rotor in an axial direction;
    a bearing which rotatably holds said rotor at a predetermined position while receiving an urging force by said urging member;
    said stator being provided with a resin coil bobbin made by insert molding and integratedly assembled with a metal stator core;
    said stator core being arranged in and facing said rotor and forming a magnetic circuit;
    said coil bobbin having a cylinder portion which is inserted into a frame at a first end of said coil bobbin;
    a cap portion integratedly formed in one side of said coil bobbin by resin molding at a yoke, said cap portion holding said urging member so as to urge said rotor to said bearing side; and
    a case being formed by curling fits in an outside of a winding wound by said electric coil bobbin in a circumferential direction of said stator, said case being formed by curling such that a flat plate-shaped metal plate is rounded.

2. The motor according to claim 1, wherein said holding portion protrudes in a shaft direction to the outside-from an open end of one of said case formed by curling.

3. The motor according to claim 1, wherein said stator core is exposed to a bearing side and an exposed part of said stator core abuts directly on a frame supporting said bearing.

4. The motor according to claim 1, wherein an opening portion is formed between both ends in a circumferential direction of said case, and a terminal portion which is formed integratedly on said electric coil bobbin and protrudes from said opening portion to the outside in a radial direction.

5. The motor according to claim 1, wherein:

said bearing is the first bearing;

a second bearing is arranged between said urging member and said center shaft, said second bearing being supported on an end side of said center shaft;

said second receiving an urging force of said urging member; and said center shaft being urged through said bearing to the side of said first said bearing.

6. The motor according to claim 1, wherein an outer diameter of said holding portion has a dimension approximately the same as that of the inside diameter of said case formed by curling.

* * * * *